J. MUMMA.
Corn Sheller.
No. 6,526.
Patented June 12, 1849.
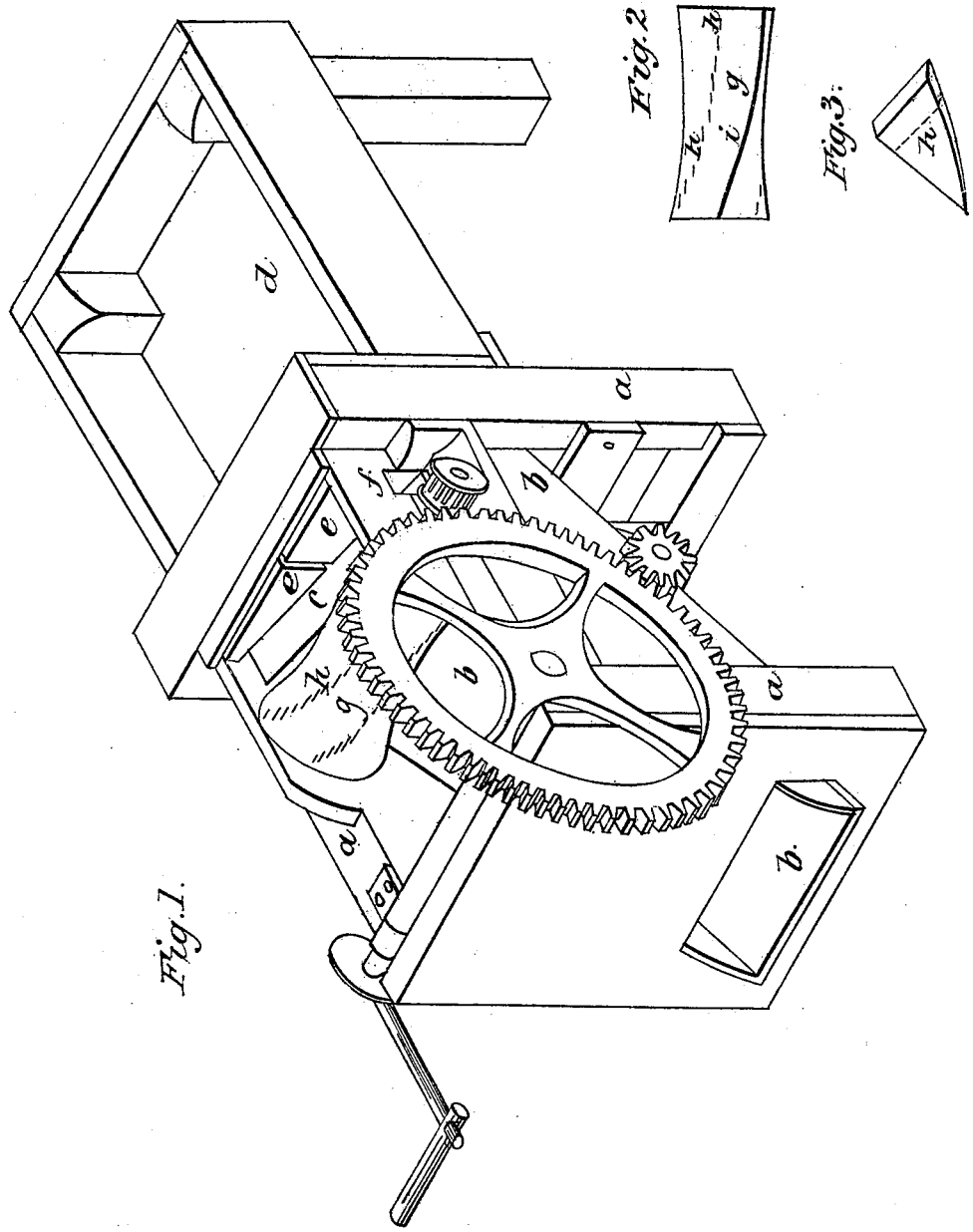

UNITED STATES PATENT OFFICE.

JACOB MUMMA, OF MIDDLETOWN, PENNSYLVANIA.

CORN-SHELLER.

Specification of Letters Patent No. 6,526, dated June 12, 1849.

*To all whom it may concern:*

Be it known that I, JACOB MUMMA, of Middletown, in the county of Dauphin and State of Pennsylvania, have invented a new and useful Improvement in Corn-shellers, and that the following is a full, clear, and exact description of the principle or character which distinguishes it from all other things before known and of the usual manner of making, modifying, and using the same, reference being had to the accompanying drawing, which forms a part of the same, in which—

Figure 1 is an isometrical projection. Fig. 2, the runner detached. Fig. 3 one of the wrought iron teeth.

The machine may be driven by hand or by horse or other power.

The nature of my improvements consist principally in the peculiar formation of the runner, and its adaptation to the stationary breast beam with spring blocks thereon, by which I am enabled to shell corn with greater facility, and less labor than in the ordinary way; the peculiarity of the arrangement consists in so placing the inclined breast beam in juxtaposition with the runner, as to make every part of the straight line of the beam to approach the curved face of the runner at nearly the same distance at all points. The angular form of the rows of teeth, and the peculiar form of the runner, cause the corn to be raked off from end to end of the cob, which is supported on the permanent breast beam, and is caused to pass out of the machine with increased rapidity as it is shelled, by which means a greater quantity can be shelled with the same power in a given time, than by a cylindrical runner or other device, with which I am acquainted.

The construction is as follows: the frame (*a*) consists of four upright posts, connected by proper cross-ties near the top, within which there is an inclined spout (*b*) leading from the cylinder down to the front of the machine, for discharging the shelled corn; at the upper end of this spout there is an inclined transverse breast beam (*c*), on to which the ear of corn is fed by hand from a box (*d*) situated conveniently behind the machine for that purpose. On the top of the breast beam (*c*) are two sliding blocks (*e*) with springs behind them, for the purpose of forcing the ear of corn against the cylinder to be shelled, and there is an opening (*f*) at the lower end of the inclined beam (*c*) through the side to deliver the cob through after it has been shelled.

The runner *g* is hung in the frame just in front of the breast beam, (*c*) and runs quite near to it, instead of being made straight or cylindrical on its surface it is concaved, the center diameter being smaller than the diameter of the two ends, as is clearly shown in Fig. 2; into this runner are driven spiral rows of teeth *h*, or ribs *i*, that project beyond its surface sufficiently to shell the ears of corn that are laid against it; by this form of the cylinder the process of shelling the ears of corn is greatly facilitated, and the cobs more freely discharged; the whole apparatus works lighter, is less liable to clog, and requires less power to drive it than the machines now in ordinary use. The rubbing parts I face with cast iron.

Having thus fully described my improvements, what I claim therein as new, and for which I desire to secure Letters Patent, is—

The employment of concave runner by means of which the cobs are more freely discharged armed with spiral rows of teeth, or ribs combined with the inclined breast beam and spring block, substantially in the manner and for the purpose set forth in the preamble and specification.

JACOB MUMMA.

Witnesses:
J. J. GREENOUGH,
WM. GREENOUGH.